US012802625B2

(12) United States Patent
Sun et al.

(10) Patent No.: US 12,802,625 B2
(45) Date of Patent: Nov. 17, 2026

(54) DISPLAY PANEL AND DISPLAY DEVICE

(71) Applicants: Wuhan Tianma Micro-Electronics Co., Ltd., Wuhan (CN); Wuhan Tianma Micro-Electronics Co., Ltd. Shanghai Branch, Shanghai (CN)

(72) Inventors: Chenguang Sun, Wuhan (CN); Xingyao Zhou, Wuhan (CN); Yana Gao, Wuhan (CN); Mengmeng Zhang, Wuhan (CN); Shuai Yang, Wuhan (CN)

(73) Assignees: Wuhan Tianma Micro-Electronics Co., Ltd., Wuhan (CN); Wuhan Tianma Micro-Electronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 19/236,293

(22) Filed: Jun. 12, 2025

(65) Prior Publication Data

US 2026/0155090 A1 Jun. 4, 2026

(30) Foreign Application Priority Data

Dec. 3, 2024 (CN) ......................... 202411764441.9

(51) Int. Cl.
*G09G 3/32* (2016.01)

(52) U.S. Cl.
CPC ......... *G09G 3/32* (2013.01); *G09G 2300/043* (2013.01); *G09G 2300/0819* (2013.01);
(Continued)

(58) Field of Classification Search
CPC ...... G09G 3/32–3291; G09G 2300/0421–043; G09G 2300/0819; G09G 2300/0842; G09G 2310/0243; G09G 2310/0264; G09G 2310/0286; G09G 2310/06; G09G 2310/08;
(Continued)

(56) References Cited

U.S. PATENT DOCUMENTS

2015/0022512 A1* 1/2015 Ahn ..................... G09G 3/3659
345/212
2021/0110769 A1* 4/2021 Ueno ................... G09G 3/3275
(Continued)

FOREIGN PATENT DOCUMENTS

CN 115188309 A 10/2022

*Primary Examiner* — Nathan Danielsen
(74) *Attorney, Agent, or Firm* — Anova Law Group, PLLC

(57) ABSTRACT

A display panel includes: light-emitting pixels arranged in an array, first shift register units, and second shift register units. A light-emitting pixel includes a pixel circuit and a light-emitting element. The pixel circuit includes a driving transistor, a data writing transistor, and a threshold compensation transistor. The driving transistor provides a driving current for the light-emitting element. One first shift register unit is at least used to provide a first control signal to a gate of one data writing transistor; and one second shift register unit is at least used to provide a second control signal to one threshold compensation transistor. A first conduction period of the data writing transistor at least partially overlaps a second conduction period of the threshold compensation transistor, and a cut-off time of the second conduction period precedes a cut-off time of the first conduction period.

19 Claims, 19 Drawing Sheets

(52) U.S. Cl.
CPC . *G09G 2310/0286* (2013.01); *G09G 2310/08* (2013.01); *G09G 2320/0233* (2013.01); *G09G 2320/0247* (2013.01); *G09G 2330/021* (2013.01)

(58) Field of Classification Search
CPC ... G09G 2320/0233; G09G 2320/0242; G09G 2320/0247; G09G 2330/021
See application file for complete search history.

(56) References Cited

U.S. PATENT DOCUMENTS

| | | | | |
|---|---|---|---|---|
| 2021/0287605 | A1* | 9/2021 | Wang | G09G 3/3233 |
| 2021/0327352 | A1* | 10/2021 | Zhang | G09G 3/3291 |
| 2023/0230543 | A1* | 7/2023 | Kim | G09G 3/3233<br>345/691 |
| 2024/0005847 | A1* | 1/2024 | Yang | G09G 3/3266 |
| 2024/0185795 | A1* | 6/2024 | Li | G09G 3/3233 |
| 2024/0265850 | A1* | 8/2024 | Heo | G09G 3/32 |

* cited by examiner

DISPLAY PANEL AND DISPLAY DEVICE

CROSS-REFERENCE TO RELATED APPLICATION

This application claims the priority of Chinese Patent Application No. 202411764441.9, filed on Dec. 3, 2024, the content of which is incorporated herein by reference in its entirety.

TECHNICAL FIELD

The present disclosure generally relates to the field of display technology and, more particularly, relates to a display panel and a display device.

BACKGROUND

With the development of display technology, people have higher and higher requirements for display panels. For example, when displaying dynamic images such as videos or games, a display panel needs to have a higher refresh rate to prevent flickering, while when displaying static images such as web page text browsing, the refresh rate of the display panel needs to be lower to reduce power consumption.

To drive the display panel to display, a driving circuit is provided in the existing display panel. The driving circuit includes a plurality of cascaded shift registers. The plurality of shift registers is electrically connected to a plurality of scan lines in the display panel. The plurality of cascaded shift registers is used to sequentially input scan signals to the plurality of scan lines in the display panel to scan the display panel from top to bottom or from bottom to top, thereby realizing the display of the display panel.

To improve the low-frequency display effect, a pixel circuit usually splits the scanning signal and sets a separate shift register to drive the split scanning signal. However, the level jump of the output signal of each shift register after the split will affect the accuracy of data writing, thereby affecting the display effect.

SUMMARY

One aspect of the present disclosure provides a display panel. The display panel includes: light-emitting pixels arranged in an array, first shift register units, and second shift register units. A light-emitting pixel includes a pixel circuit and a light-emitting element. The pixel circuit includes a driving transistor, a data writing transistor, and a threshold compensation transistor. The driving transistor is used to provide a driving current for the light-emitting element. In the data writing transistor, a first electrode is electrically connected to a data signal line, and a second electrode is electrically connected to a first electrode of the driving transistor. In the threshold compensation transistor, a first electrode is electrically connected to a second electrode of the driving transistor, and a second electrode is electrically connected to a gate of the driving transistor. One first shift register unit is at least used to provide a first control signal to a gate of one data writing transistor; and one second shift register unit is at least used to provide a second control signal to one threshold compensation transistor. A first conduction period of the data writing transistor at least partially overlaps with a second conduction period of the threshold compensation transistor, and a cut-off time of the second conduction period precedes a cut-off time of the first conduction period.

Another aspect of the present disclosure provides a display device. The display device includes a display panel. The display panel includes: light-emitting pixels arranged in an array, first shift register units, and second shift register units. Each light-emitting pixel includes a pixel circuit and a light-emitting element. The pixel circuit includes a driving transistor, a data writing transistor, and a threshold compensation transistor. The driving transistor is used to provide a driving current for the light-emitting element. In the data writing transistor, a first electrode is electrically connected to a data signal line, and a second electrode is electrically connected to a first electrode of the driving transistor. In the threshold compensation transistor, a first electrode is electrically connected to a second electrode of the driving transistor, and a second electrode is electrically connected to a gate of the driving transistor. One first shift register unit is at least used to provide a first control signal to a gate of one data writing transistor; and one second shift register unit is at least used to provide a second control signal to one threshold compensation transistor. A first conduction period of the data writing transistor at least partially overlaps with a second conduction period of the threshold compensation transistor, and a cut-off time of the second conduction period precedes a cut-off time of the first conduction period.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
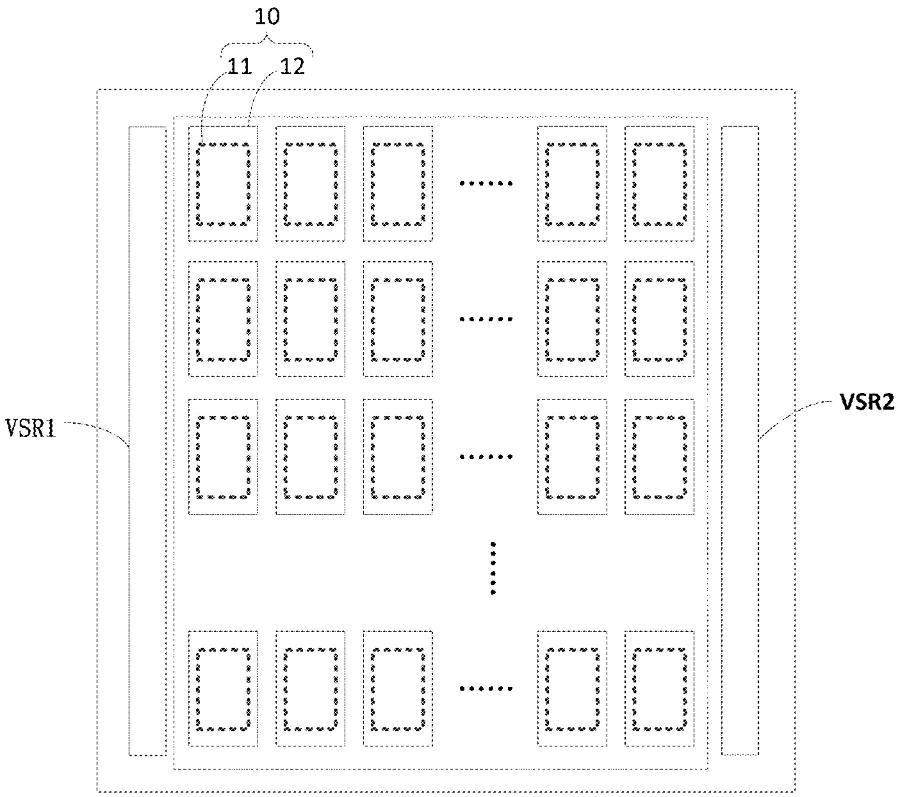
FIG. 1 illustrates an exemplary display panel consistent with various disclosed embodiments in the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted. Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width, and depth should be considered during practical fabrication.

In the present disclosure, terms such as “center”, “longitudinal”, “lateral”, “length”, “width”, “thickness”, “up”, “down”, “front”, “back”, “left”, “right”, “vertical”, “horizontal”, “top”, “bottom”, “inside”, “outside”, “clockwise”, “counterclockwise”, “axial”, “radial”, “circumferential”, etc., indicate orientations or positional relationships based on the orientations or positional relationships shown in the accompanying drawings, and are only for the convenience of describing the present disclosure and simplifying the description, and do not indicate or imply that the device or element referred to must have a specific orientation, be constructed and operated in a specific orientation, and therefore should not be understood as limiting the present disclosure.

In the present disclosure, relational terms such as first and second are only used to distinguish one entity or operation from another entity or operation, and do not necessarily require or imply any such actual relationship between these entities or operations or order. Moreover, the terms “including”, “comprising” or any other variants thereof are intended to cover non-exclusive inclusion, such that a process, method, article, or device that includes a series of elements includes not only those elements, but also those that are not explicitly listed or also include elements inherent to this process, method, article or equipment. If there are no more restrictions, the elements defined by the sentence “including . . . ” do not exclude the existence of other same elements in the process, method, article, or equipment that includes the elements.

It should be understood that when describing the structure of a component, when a layer or region is referred to as being “on” or “above” another layer or another region, the layer or region may be directly on the other layer or region, or indirectly on the other layer or region, for example, layers/components between the layer or region and another layer or another region. And, for example, when the component is reversed, the layer or region may be “below” or “under” the other layer or region. In the present disclosure, the term “electrical connection” refers to that two components are directly electrically connected with each other, or the two components are electrically connected via one or more other components.

In the present disclosure, unless otherwise clearly specified and limited, the terms “installed”, “connected”, “fixed” and the like appear, should be understood in a broad sense. For example, it can be a fixed connection, a detachable connection, or an integrated connection; it can be a mechanical connection or an electrical connection; it can be a direct connection or an indirect connection through an intermediate medium, it can be the internal connection of two elements or the interaction relationship between two elements, unless otherwise clearly defined. For those skilled in the art, the specific meanings of the above terms in the present disclosure can be understood according to the specific circumstances.

In the present disclosure, when an element is referred to as being “fixed to” or “disposed on” another element, it may be directly on the other element or there may be an intermediate element. When an element is considered to be “connected to” another element, it may be directly connected to the other element or there may be an intermediate element at the same time. If present, the terms “vertical”, “horizontal”, “upper”, “lower”, “left”, “right” and similar expressions are for illustrative purposes only and are not intended to be the only embodiment.

Figure 2:
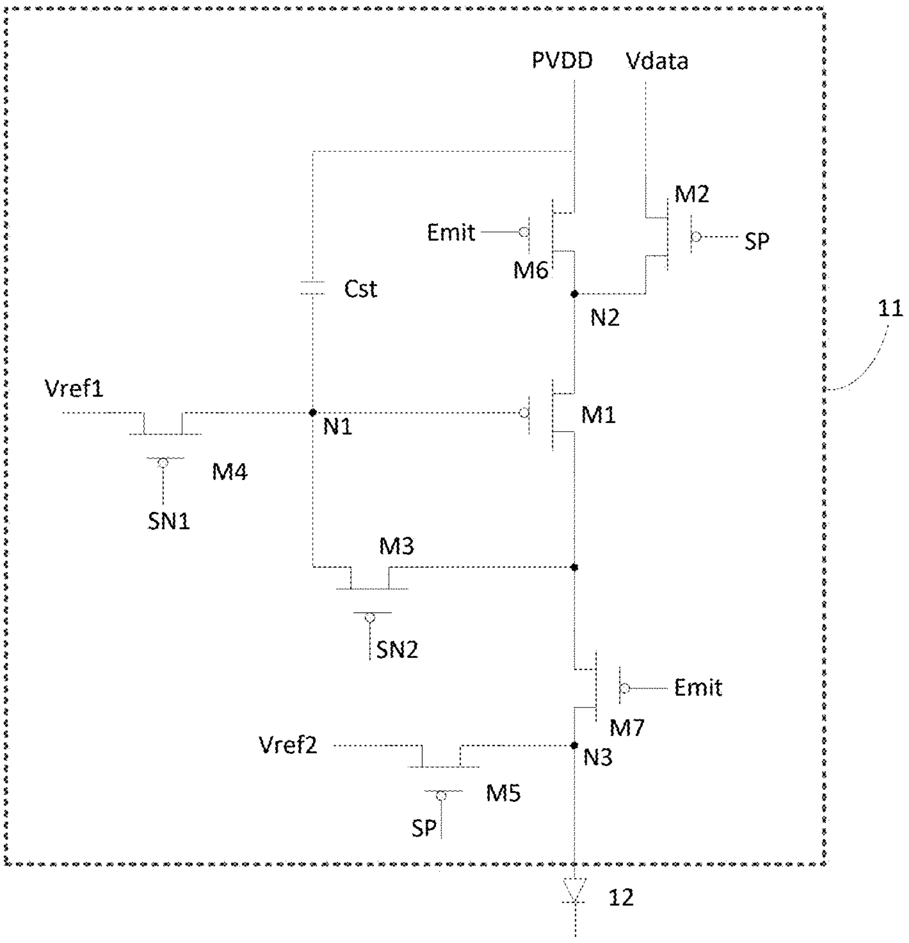
FIG. 2 illustrates an exemplary pixel circuit consistent with various disclosed embodiments in the present disclosure.

The present disclosure provides a display panel. FIG. 1 is a schematic diagram of the structure of an exemplary display panel consistent with the present disclosure, and FIG. 2 is a schematic diagram of the structure of an exemplary pixel circuit provided by the present disclosure. As shown in FIG. 1 and FIG. 2, in one embodiment, the display panel may include a plurality of light-emitting pixels 10 arranged in an array, and each light-emitting pixel of the plurality of light-emitting pixels 10 may include a pixel circuit 11 and a light-emitting element 12. The pixel circuit may include a driving transistor M1, a data writing transistor M2, and a threshold compensation transistor M3. The driving transistor M1 may be used to provide a driving current for the light-emitting element 12. A first electrode of the data writing transistor M2 may be electrically connected to a data signal line Vdata, and a second electrode of the data writing transistor M2 may be electrically connected to a first electrode of the driving transistor M1. A first electrode of the threshold compensation transistor M3 may be electrically connected to the second electrode of the driving transistor M1, and a second electrode of the threshold compensation transistor M3 may be electrically connected to the gate of the driving transistor M1. It should be noted that one of the first electrode and the second electrode of one transistor may be a source electrode and the other may be a drain electrode. The driving transistor may generate a driving current under the control of the gate voltage. The driving transistor M1 may be electrically connected to the light-emitting element 12, to provide the driving current to the light-emitting element 12 for controlling the light-emitting element 12 to emit light.

The display panel may further include first shift register units VSR1, which are at least used to provide first control signals SP to gates of data writing transistors M2. When the first control signal SP is at an effective level, the data writing transistor M2 may be turned on.

The display panel may further include second shift register units VSR2, which are at least used to provide second control signals SN2 to threshold compensation transistors M3. When the second control signal SN2 is at an effective level, the threshold compensation transistor M3 may be turned on.

Figure 3:
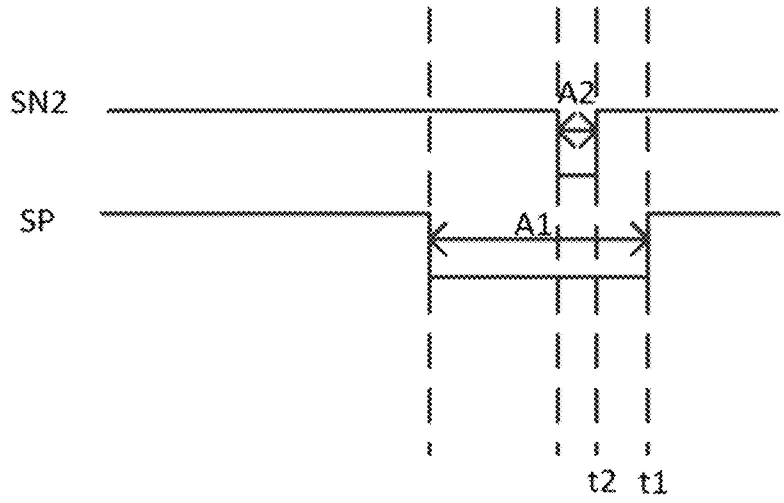
FIG. 3 illustrates a driving timing diagram of an exemplary display panel consistent with various disclosed embodiments in the present disclosure.

FIG. 3 is a display panel driving timing diagram provided by an embodiment of the present disclosure. As shown in FIG. 3, in one embodiment, for example, the effective level of the first control signal SP may be a low level, that is, the data writing transistor may be turned on when the first control signal SP is at a low level. The effective level of the second control signal SN2 may be a low level, that is, the threshold compensation transistor may be turned on when the second control signal SN2 is at a low level. FIG. 3 exemplarily shows that A1 is the first conduction period of the data writing transistor M2, and A2 is the second conduction period of the threshold compensation transistor M3. In the present embodiment, the first conduction period A1 of the data writing transistor M2 may at least partially overlap the second conduction period A2 of the threshold compensation transistor M3, and the cut-off time t2 of the second conduction period may precede the cut-off time t1 of the first conduction period A1.

Figure 4:
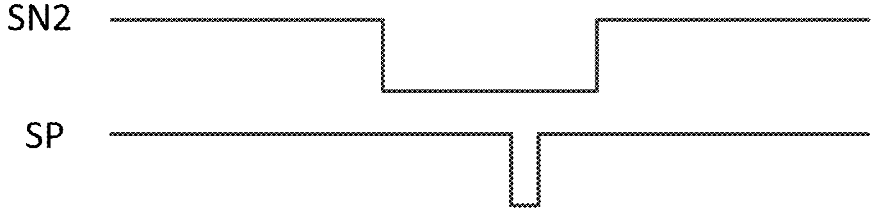
FIG. 4 illustrates a driving timing diagram of a display panel.

When the data writing transistor M2 is turned on, the data signal on the data signal line Vdata may be transmitted to the first electrode of the driving transistor M1. When the threshold compensation transistor M3 is turned on, the connection between the first electrode of the driving transistor M1 and the gate of the driving transistor M1 may be turned on. Therefore, in the overlapping period of the first conduction period A1 and the second conduction period A2, the data writing transistor M2 and the threshold compensation transistor M3 may be turned on at the same time, and the data signal on the data signal line may be written into the gate (the N1 node) of the driving transistor M1. Since the data writing transistor M2 and the threshold compensation transistor M3 are driven by different shift register units, when the data writing transistor M2 is turned off before the threshold compensation transistor M3, as shown in the timing diagram in FIG. 4 in existing technologies, the first control signal SP of the data writing transistor M2 first jumps to a high level (exemplarily setting the first control signal SP to a low level as an effective level), and the second control signal SN2 of the threshold compensation transistor M3 then jumps to a high level (exemplarily setting the second control signal SN2 to a low level as an effective level). In this timing of the existing technologies, after the data writing transistor M2 is turned off, the threshold compensation transistor M3 is still in the on state, such that the potential at the gate of the driving transistor M1 is no longer the potential after the threshold compensation, and the data writing process is affected by the jumps of the first control signal SP and the second control signal SN2 at the same time, affecting the accuracy of data writing.

As can be seen from the driving timing of the present disclosure with reference to FIG. 3, in the present disclosure, the first conduction period A1 of the data writing transistor M2 may at least partially overlap the second conduction period A2 of the threshold compensation transistor M3, and the cut-off time t2 of the second conduction period may precede the cut-off time t1 of the first conduction period. Therefore, the threshold compensation transistor M3 may be turned off first, and the data writing transistor M2 may be turned off later. After the threshold compensation transistor M3 is turned off, the data writing process may stop randomly, and the jump of the first control signal SP may no longer affect the data signal voltage stored in the pixel circuit.

In some embodiments, the number of rows of pixel circuits electrically connected to one first shift register unit may be set to be the same as the number of rows of pixel circuits electrically connected to one corresponding second shift register unit.

Figure 5:
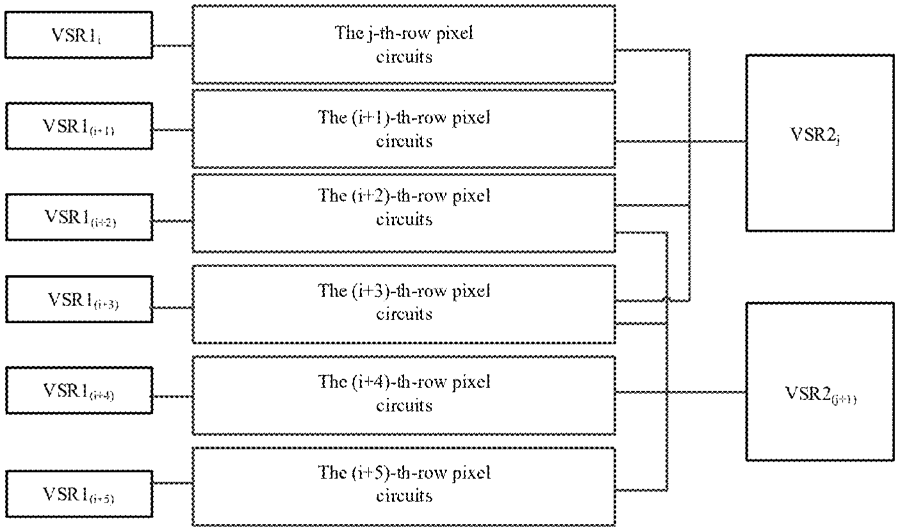
FIG. 5 illustrates a schematic connection of a shift register unit.

In existing technologies, the number of rows of pixel circuits connected to one shift register unit that drives the data writing transistors may be different from the number of rows of pixel circuits electrically connected to one shift register unit that drives the threshold compensation transistors. FIG. 5 is a connection schematic diagram of shift registers. As shown in FIG. 5, each shift register unit VSR2 of the threshold compensation transistors (two cascaded shift register units VSR2*j* and VSR2(j+1) are exemplarily shown in FIG. 5) bears the load of four rows of pixel circuits, and each shift register unit VSR1 of the drive data writing transistors (six cascaded shift register units VSR1*i*, VSR1(i+1), VSR1(i+2), VSR1(i+3), VSR1(i+4), and VSR1(i+5) are exemplarily shown in FIG. 5) bears the load of one row of pixel circuits, where i and j both represent positive integers greater than or equal to 1.

Figure 6:
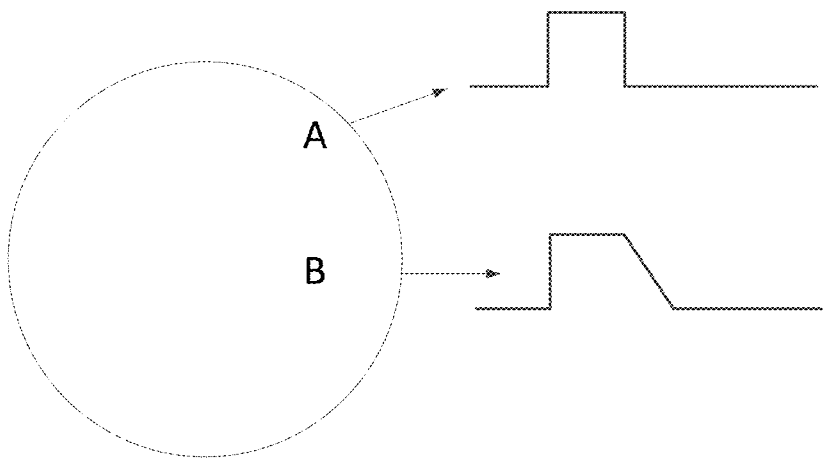
FIG. 6 illustrates a schematic diagram of the delay of the control signal of the threshold compensation transistor at different positions of the special-shaped display panel.

As shown in FIG. 6, in a special-shaped display panel (such as a display screen of a round watch or a display screen with a hole in the camera area), the number of light-emitting pixels in each row at different positions of the special-shaped display panel is different. The number of light-emitting pixels in each row at position B is larger than the number of light-emitting pixels in each row at position A, such that the load of the shift registers driving the threshold compensation transistors at position B is significantly larger than the load at position A. As shown in FIG. 5, each shift register unit VSR2 driving the threshold compensation transistors needs to bear four rows of loads, while each shift register unit driving the data writing transistors bears one row of loads, which will aggravate the delay difference of the control signals of the shift register units driving the threshold compensation transistors and the shift register units driving the data writing transistors at different positions. Since data can be written only when the data writing transistors and the threshold compensation transistors are turned on at the same time, the above-mentioned delay difference will cause the difference between the conduction periods of the data writing transistors and the threshold compensation transistors, thereby causing different charging times at different positions of the display panel and display differences. Therefore, in the present disclosure, the number of rows of pixel circuits electrically connected to one first shift register unit may be set to be the same as the number of rows of pixel circuits electrically connected to one second shift register unit. Since the first shift register unit is used to provide a first control signal to the gates of the data writing transistors to control the on or off of the data writing transistors, and the second shift register unit is used to provide a second control signal to the gates of the threshold compensation transistors to control the on or off of the threshold compensation transistors, regardless of whether it is the first shift register unit or the second shift register unit, each level of shift register unit may carry the same number of pixel row loads.

Figure 7:
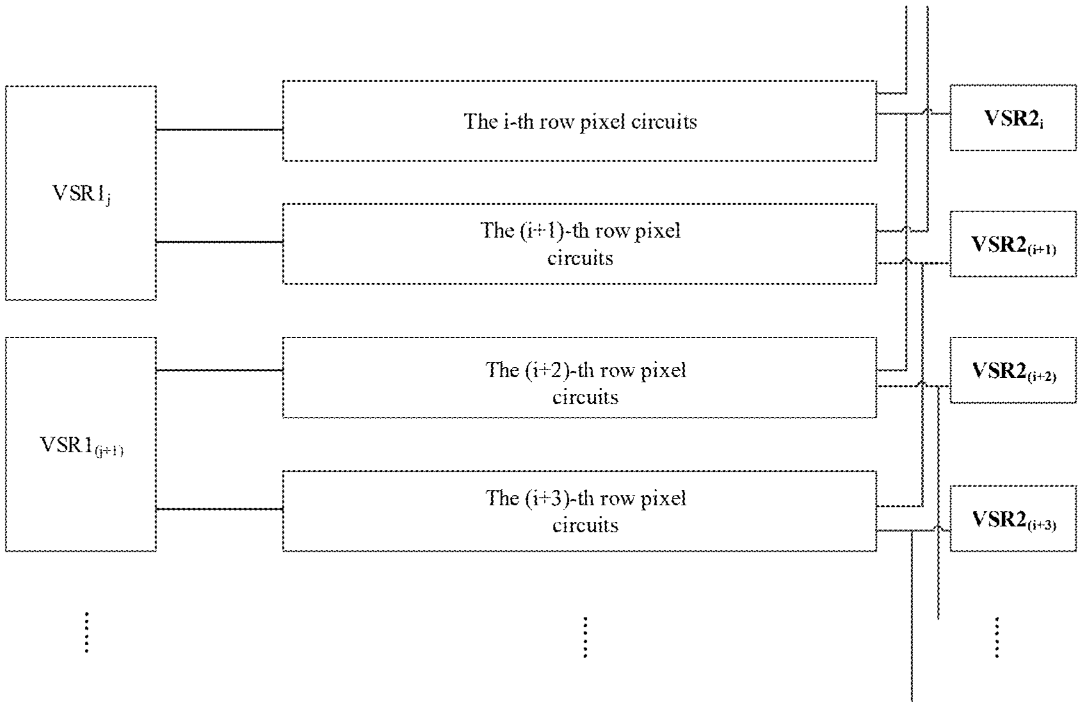
FIG. 7 illustrates a schematic connection of a shift register unit consistent with various disclosed embodiments in the present disclosure.

In one embodiment, as shown in FIG. 7 which is a connection diagram of shift register units, each first shift register unit VSR1 that drives the data writing transistors (FIG. 7 exemplarily shows two cascaded shift register units VSR1*j* and VSR1(j+1)) may bear the load of two rows of pixel circuits), and each shift register unit VSR2 that drives the threshold compensation transistors (FIG. 7 exemplarily shows four cascaded shift register units VSR2*i*, VSR2(i+1), VSR2(i+2), and VSR2(i+3)) may bear the load of two rows of pixel circuits, where i and j both represent positive integers greater than or equal to 1. Therefore, each level of the first shift register unit VSR1 and each level of the second shift register unit VSR2 may bear the load of two rows of pixel circuits respectively, such that the first shift register units VSR1 and the second shift register units VSR2 may carry the load more evenly and the control signals of the data writing transistors and the threshold compensation transistors of the pixel circuits at different positions may be more coordinated. The load differences of the shift register units connected to the pixel circuits at different positions may be prevented, and the problem of uneven delay difference may be improved.

It should be noted that in the present disclosure, the embodiment shown in FIG. 7 where the number of rows of pixel circuits electrically connected to one first shift register unit and the number of rows of pixel circuits electrically connected to one second shift register unit are both two rows is used as an example to illustrate the present disclosure, and does not limit the scope of the present disclosure. In various embodiments, the number of rows of pixel circuits electrically connected to one first shift register unit and the number of rows of pixel circuits electrically connected to one second shift register unit may be set according to the actual needs of the display panel. For example, they may both be three or four rows, or other integer rows. The embodiments of the present disclosure do not limit the number of rows of pixel circuits electrically connected to the first shift register unit and the number of rows of pixel circuits electrically connected to the second shift register unit.

In some embodiments, one pixel circuit may also include a first initialization transistor, which is connected between the gate of the driving transistor and the first initialization signal line.

In one same pixel circuit, the cut-off time of the third conduction period of the first initialization transistor may precede the start time of the second conduction period.

Figure 8:
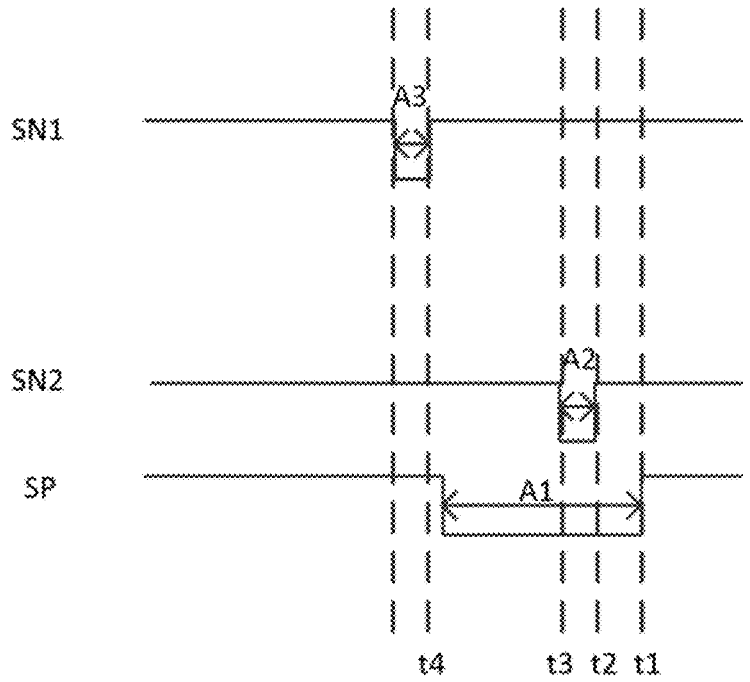
FIG. 8 illustrates another driving timing diagram of an exemplary display panel consistent with various disclosed embodiments in the present disclosure.

As shown in FIG. 2, the first initialization transistor M4 may be connected between the gate of the driving transistor M1 and the first initialization signal line Vref1. When the first initialization transistor M4 is turned on, it may be used to provide a first initialization signal to the gate of the driving transistor to initialize the gate of the driving transistor M1. FIG. 8 is another driving timing diagram. As shown in FIG. 8, in one embodiment, the cut-off time t4 of the third conduction period A3 of the first initialization transistor M4 may precede the start time t3 of the second conduction period A2. SN1 may represent the control signal of the gate of the first initialization transistor. SN2 may represent the control signal of the gate of the data writing transistor. Before data is written (before the threshold compensation transistor M3 is turned on), the first initialization transistor M4 may be turned on to provide the first initialization signal to the gate of the driving transistor M1 to avoid the influence of the gate potential of the driving transistor M1 of the previous frame on the display of the current frame. Therefore, the cut-off time t4 of the third conduction period A3 of the first initialization transistor M4 may be set to precede the opening time t3 of the second conduction period A2.

In some embodiments, one second shift register unit may be electrically connected to the gates of the threshold compensation transistors corresponding to the pixel circuits of the i-th row and the gates of the first initialization transistors corresponding to the pixel circuits of the (i+x)-th row; where i and X are both positive integers greater than or equal to 1.

In the present disclosure, one second shift register unit may be connected with the gates of the threshold compensation transistors of the pixel circuits of the i-th row and the gates of the first initialization transistors of the pixel circuits of the (i+x)-th row, such that one second shift register unit may drive two rows of loads. Compared with separately setting shift register units for the first initialization transistors and the threshold compensation transistors, the first initialization transistors and the threshold compensation transistors may multiplex the control signal output by the shift register units, to reduce the number of shift register units set in the border area of the display panel, thereby achieving the effect of reducing costs and reducing the frame size.

Figure 9:
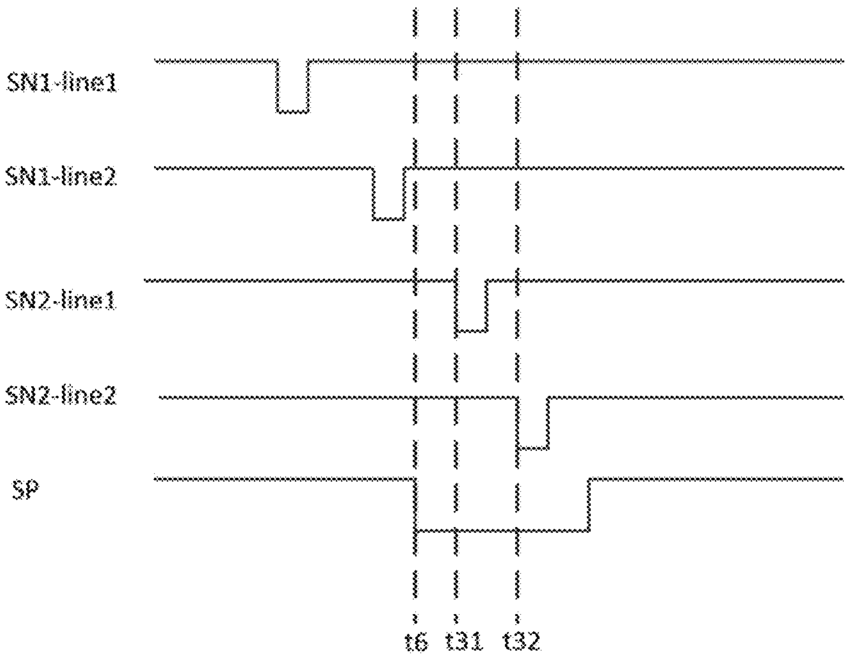
FIG. 9 illustrates another driving timing diagram of an exemplary display panel consistent with various disclosed embodiments in the present disclosure.

In some embodiments, one second shift register unit may be electrically connected to the gates of the threshold compensation transistors corresponding to the pixel circuits of the i-th row and the gates of the first initialization transistors corresponding to the pixel circuits of the (i+2)-th row. In one embodiment shown in FIG. 7, each second shift register unit may be connected to pixel circuits alternately by one row, and the corresponding driving timing may be as shown in FIG. 9. FIG. 8 is illustrated by taking the driving of the first-row pixel circuits line1 and the second-row pixel circuits line2 as an example. SN1-line1 represents the control signal of the gates of the first initialization transistors of the first-row pixel circuits, SN1-line2 represents the control signal of the gates of the first initialization transistors of the second-row pixel circuit, SN2-line1 represents the control signal of the gates of the threshold compensation transistors of the first-row pixel circuits, SN2-line2 represents the control signal of the gates of the threshold compensation transistors of the second-row pixel circuit, and SP represents the control signal of the gates of the data writing transistors of the first row-pixel circuit and the second-row pixel circuit.

As shown in FIG. 7, the first shift register units VSR1 may adopt a one-drive-two design, and the second shift register units VSR2 may adopt a one-drive-one design and a borrow setting. Borrow setting may mean that each second shift register unit VSR2 provides the second control signal for the threshold compensation transistors of the corresponding pixel circuits in this row, and provides a control signal for the first initialization transistors of the pixel circuits of a certain row after this row. For example, in FIG. 7, VSR2*i* may provide the second control signal SN2 for the threshold compensation transistors of the pixel circuits of the i-th row, and provide the control signal SN1 for the first initialization transistors of the pixel circuits of the (i+2)-th row.

Since the pixel circuits electrically connected to each second shift register are separated by one row, for the pixel circuits of the same row, the interval between SN1 and SN2 may be long, and the first initialization transistors of each row of pixel circuits may reset the driving transistors from the falling edge of SN1 corresponding to the pixel circuits of this row to the falling edge of SN2 of the pixel circuits of this row (the exemplary setting of SN1 and SN2 in FIG. 9 is an effective level when it is low), such that the reset time of the first initialization transistors may be set relatively long to better improve the afterimage problem.

Figure 10:
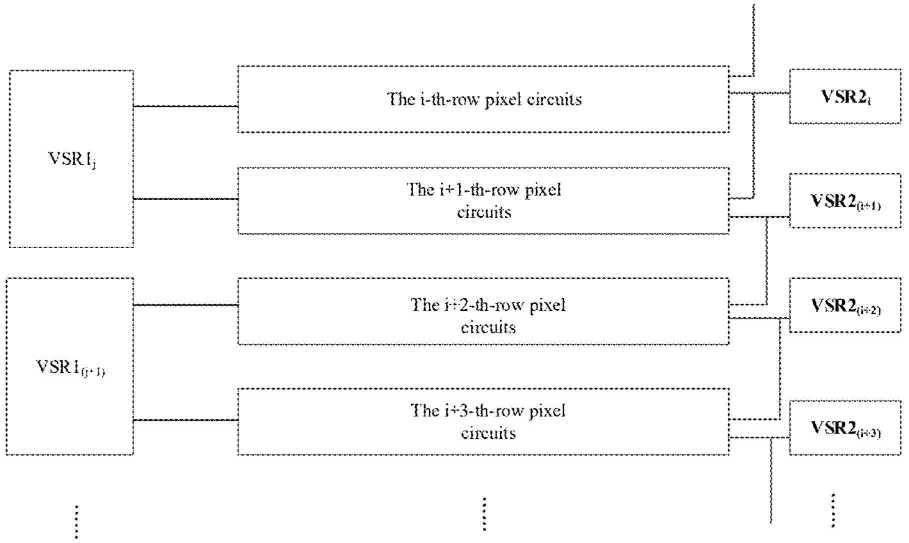
FIG. 10 illustrates another schematic connection of a shift register unit consistent with various disclosed embodiments in the present disclosure.

In some embodiments, one second shift register unit may be electrically connected to the gates of the threshold compensation transistors corresponding to the pixel circuits of the i-th row and the gates of the first initialization transistors corresponding to the pixel circuits of the (i+1)-th row. As shown in FIG. 10, each second shift register unit may be connected with two adjacent rows of pixel circuits. Since this layout does not require cross-row wiring, the wiring may be short and simple.

As shown in FIG. 10, the first shift register units VSR1 may adopt a one-drive-two design, and the second shift register units VSR2 may adopt a one-drive-one design and a borrow setting. The borrow setting may mean that each second shift register unit VSR2 provides the second control signal for the threshold compensation transistors of the corresponding pixel circuits in this row, and provides the control signal for the first initialization transistors of the pixel circuits of the next row. For example, as shown in FIG. 10, VSR2*i* may provide the second control signal SN2 for the threshold compensation transistors of the pixel circuits of the i-th row, and provide the control signal SN1 for the first initialization transistors of the pixel circuits of the (i+1)-th row.

In some embodiments, one first shift register unit may be electrically connected to the gates of the data writing transistors corresponding to the pixel circuits of the i-th row and the gates of the data writing transistors corresponding to the pixel circuits of the (i+1)-th row. As shown in FIG. 7 and FIG. 10, each first shift register unit may drive two rows of loads. Compared with the existing technologies (for example, as shown in FIG. 5) in which one shift register unit VSR1 drives one row of loads, the number of shift register units set in the frame area of the display panel may be reduced, thereby reducing the frame size.

In some embodiments, one pixel circuit may also include light-emitting control transistors connected in series with the driving transistor. The light-emitting control transistors may be used to selectively allow the light-emitting element to enter the light-emitting stage. Accordingly, the display panel may further include third shift register units, which are electrically connected to the gates of the light-emitting control transistors in the pixel circuits. One third shift register unit may be used to provide a third control signal to corresponding pixel circuits and the light-emitting control transistors may be turned on in response to the third control signal.

As shown in FIG. 2, in one embodiment, the light-emitting control transistors may include a first light-emitting control transistor M6 and a second light-emitting control transistor M7. The gate of the first light-emitting control transistor M6 and the gate of the second light-emitting control transistor M7 may be electrically connected to one corresponding third shift register unit. The first light-emitting control transistor M6 and the second light-emitting control transistor M7 may be turned on and off by the third control signal Emit outputted from the output terminal of the third shift register unit. When the first light-emitting control transistor M6 and the second light-emitting control transistor M7 are P-type transistors, the first light-emitting control transistor M6 and the second light-emitting control transistor M7 may be turned on when the third control signal Emit outputted by the third shift register unit is a low-level signal, and turned off when the third control signal Emit outputted by the third shift register unit is a high-level signal. The first electrode of the first light-emitting control transistor M6 may be electrically connected to the first power supply voltage terminal PVDD, and the second electrode of the first light-emitting control transistor M6 may be electrically connected to the first electrode of the driving transistor M1. The second electrode of the driving transistor M1 may be electrically connected to the first electrode of the second light-emitting control transistor M7, and the second electrode of the second light-emitting control transistor M7 may be electrically connected to the anode of the light-emitting element 12.

Figure 11:
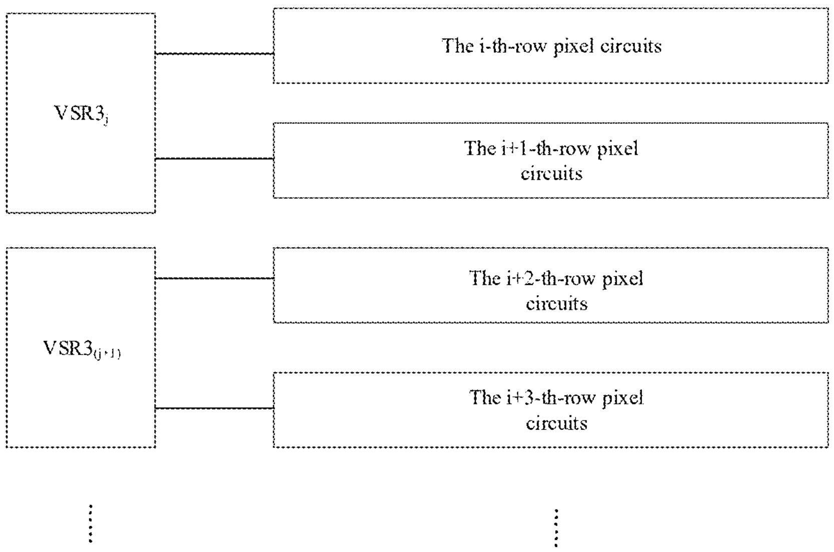
FIG. 11 illustrates another schematic connection of a shift register unit consistent with various disclosed embodiments in the present disclosure.

In some embodiments, one third shift register unit may be electrically connected to the gates of the light-emitting control transistors in the pixel circuits of the i-th row and the gates of the light-emitting control transistors in the pixel circuits of the (i+1)-th row. One third shift register unit may be used to provide the third control signal for pixel circuits of two adjacent rows. As shown in FIG. 11, in one embodiment, each third shift register unit may drive two rows of loads (FIG. 11 exemplarily shows two cascaded shift register units VSR3*j* and VSR3(j+1)). Compared with existing technologies in which each row of pixel circuits is electrically connected to one shift register unit, the third control signal may be provided to two rows of pixel circuits through one shift register unit, thereby reducing the number of shift register units, saving the number of shift register units set in the frame area of the display panel, and reducing the width of the frame area.

In some embodiments, the data writing transistor and the threshold compensation transistor may be set to be both P-type transistors. When the data writing transistor and the threshold compensation transistor are both P-type transistors, because of the same type, the first shift register unit that drives the data writing transistor and the second shift register unit that drives the threshold compensation transistor may adopt the same driving architecture, thereby reducing the complexity of the structural setting of the shift register units and reducing the cost.

In some other embodiments, the data writing transistor may be set to be a P-type transistor and the threshold compensation transistor may be set to be an N-type transistor. The driving transistor may need to generate a driving current, and the P-type transistor may have a higher mobility. The driving transistor adopting a P-type transistor may have a relatively strong driving capability. The N-type transistor may have a lower leakage current, and the threshold compensation transistor may be connected to the gate of the driving transistor. The threshold compensation transistor may be set to be an N-type transistor, which may reduce the leakage current problem of the gate of the driving transistor, thereby improving the brightness flicker problem.

It may be understood that the threshold compensation transistor M3 may usually use an oxide transistor, and the data writing transistor M2 may usually use a low-temperature polysilicon transistor. The oxide transistor may usually be an N-type transistor, and the low-temperature polysilicon transistor may usually be a P-type transistor.

In some embodiments, one pixel circuit may further include a second initialization transistor connected between the anode of the light emitting element and the second initialization signal line, where the gate of the second initialization transistor may be electrically connected to the gate of the data writing transistor.

As shown in FIG. 2, the second initialization transistor M5 may be connected between the anode of the light-emitting element 12 and the second initialization signal line Vref2. The gate of the second initialization transistor M5 and the gate of the data writing transistor M2 may be connected to the same control signal. The first control signal SP output by the first shift register unit may also be multiplexed as a control signal for the gate of the second initialization transistor M5, such that the second initialization signal line may be connected to the anode of the light-emitting element 12, and the anode of the light-emitting element 12 may be initialized. Since the first control signal SP output by the first shift register unit may be used as the control signal for the gate of the second initialization transistor M5, the shift register unit that separately drives the second initialization transistor M5 may be omitted, thereby significantly reducing the display cost. The number of shift register units set in the panel frame area may be also reduced to save the frame area of the display panel and increase the screen-to-body ratio of the display area.

In some embodiments, the frequency of the first control signal may be set to be greater than the frequency of the second control signal.

As users' requirements for the battery life of electronic devices increase, low-frequency display modes with lower power consumption are increasingly favored by users. In low-frequency mode, the pixel circuit may write the data signal Vdata to the gate of the driving transistor in a writing frame, and maintain the gate voltage of the driving transistor in a subsequent holding frame. For example, in the low-frequency mode, the refresh frequency of the picture may be lower than the refresh frequency in the normal display mode. For example, the refresh frequency in the normal display mode may be 60 Hz, and the refresh frequency in the low-frequency mode may be, for example, 30 Hz. In the low frequency mode, one display cycle may include one writing frame and at least one holding frame. In the holding frame, there may be no initialization of the drive transistor gate like the writing frame, and no new data signal may be written. That is, the screen switching may not be performed for a long period of time during low-frequency display mode, thus reducing the power consumption induced by screen switching.

Figure 12:
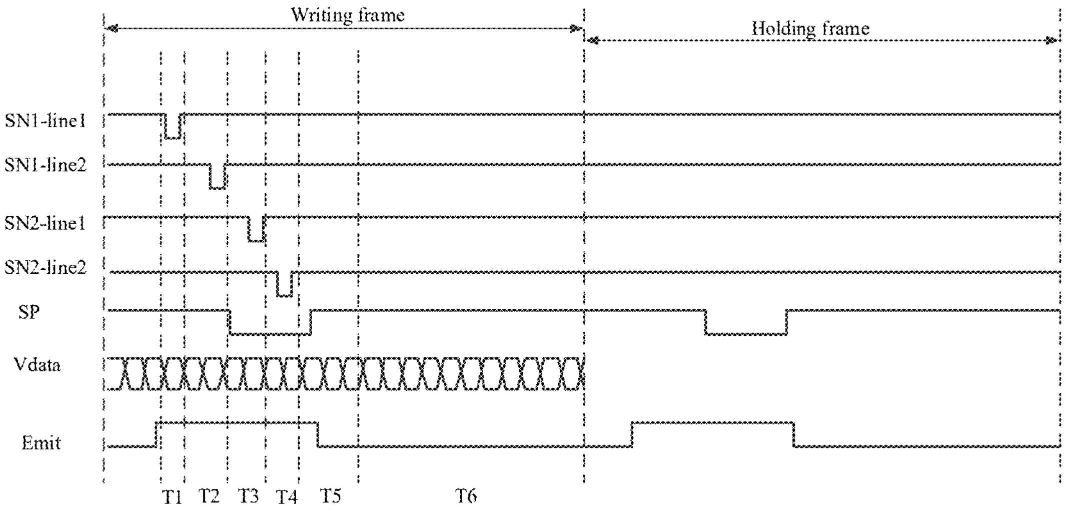
FIG. 12 illustrates another driving timing diagram of an exemplary display panel consistent with various disclosed embodiments in the present disclosure.

As shown in FIG. 2, in the writing frame, the potential of the first electrode (node N2) of the data writing transistor may be refreshed from PVDD to Vdata. The node potential of the anode (node N3) of the light-emitting element 12 may be refreshed from the potential corresponding to the light-emitting current of the previous frame to the potential Vref2 provided by the second initialization signal line. However, after the writing frame is completed, after the second initialization transistor M5 writes Vref2 to the N3 node, since Vref2 may be generally a negative bias, the light-emitting element 12 may be in a state of stopping emitting light at this time. But in the subsequent long low-frequency holding stage, the light-emitting element 12 may be always emitting light, which will cause a difference in brightness. In the embodiment of the present disclosure, the gate of the second initialization transistor M5 and the gate of the data writing transistor M2 may be electrically connected to the same shift register unit, that is, may be driven by the first control signal SP of the first shift register unit. As shown in FIG. 12 which is a driving timing diagram, the frequency of the first control signal SP may be greater than the frequency of the second control signal SN2. The second control signal SN2 driving the threshold compensation transistor M3 may maintain a relatively low frequency to realize the low-frequency display of the display panel, and the first control signal SP driving the second initialization transistor M5 may maintain a relatively high frequency. The first control signal SP may drive the second initialization transistor M5 at a higher frequency to reset the N3 node, such that the light-emitting element may also have a process of extinguishing and then emitting light in the holding frame, thereby reducing the display flicker.

In some embodiments, the pixel circuit may include a second initialization transistor connected between the anode of the light-emitting element and the second initialization signal line. The gate of the second initialization transistor may be electrically connected to the gate of the first initialization transistor.

When the low-frequency display and the flickering problem caused by the low-frequency display are not considered, the second initialization transistor may also be controlled by a control signal same as the first initialization transistor, that is, the gate of the second initialization transistor may be electrically connected to the gate of the first initialization transistor. One same shift register unit may be used to achieve the reset of the gate of the driving transistor and the anode of the light-emitting element, avoiding the residual image caused by the residual potential of the previous frame.

The driving principle of the display panel provided by the embodiments of the present disclosure will be described in detail below in conjunction with FIG. 2 and FIG. 12.

The writing frame may be divided into six stages.

In the T1 stage, SN1-line1 may be at an effective level (the effective level of SN1-line1 may be set to a low level for example), and the first initialization transistors M4 of the first row of pixel circuits may be turned on, which resets the gates of the driving transistors M1 of the first row of pixel circuits.

In the T2 stage, SN1-line2 may be at an effective level (the effective level of SN1-line2 may be set to a low level for example), and the first initialization transistors M4 of the second row of pixel circuits may be turned on, which resets the gates of the driving transistor M1 of the second row of pixel circuits.

In the T3 stage, SP may be at an effective level (the effective level of SP may be set to a low level for example), and the data writing transistors M2 of the first row of pixel circuits may be turned on; SN2-line1 may be at an effective level, and the threshold compensation transistors M3 of the first row of pixel circuits may be turned on, such that the data signal may be written into the gate N1 node of the driving transistors M1 of the first row of pixel circuits. At this time, SN2-line2 may be at a high level, and the threshold compensation transistors M3 of the second row of pixel circuits may be turned off, such that the data signal may not be mistakenly written into the gates of the driving transistors M1 of the second row of pixel circuits.

In the T4 stage, SN2-line1 may be at a high level, and the threshold compensation transistors M3 of the first row of pixel circuits may be turned off; SN2-line2 may be at a low level, and the threshold compensation transistors M3 of the second row of pixel circuits may be turned on, such the data signal may be written into the gate node N1 of the driving transistors M1 of the second row of pixel circuit.

In the T5 stage, SP may be at a high level, and the data writing transistors M2 of the first row and the second row of pixel circuits may be turned off. At this time, since SN2-line1 and SN2-line2 have both jumped to a high level, the threshold compensation transistors M3 of the first row and the second row of pixel circuits may both be turned off, that is, the second conduction period of the threshold compensation transistors M3 may be earlier than the first conduction period of the data writing transistors M2D. Therefore, the jump of SP may not cause coupling to the potential of the N1 node.

In the T6 stage, Emit may be at an effective level (the effective level of Emit may be set to a low level for example), the light-emitting control transistors (M6 and M7) may be turned on, and the light-emitting element 12 may start to emit light. In the holding frame, SN1-line1, SN1-line2, SN2-line1, and SN2-line1 may all maintain a high level without jumping, and the holding frame may maintain the gate voltage of the driving transistors. To maintain the gate-source voltage of the driving transistors in the holding frame displayed at a low frequency and maintain a bias state similar to the writing frame, in the present disclosure, SP may be controlled to jump at least once in the holding frame, that is, the frequency of the first control signal SN2 may be greater than the frequency of the second control signal SP. Further, the gate of the second initialization transistor M5 may be electrically connected to the gate of the data writing transistor M2, and both may be controlled to be turned on and off by the second control signal SP. The second initialization transistor M5 may also be driven by the first control signal SP at a high frequency to reset the N3 node, such that the light-emitting element may also have a process of extinguishing and then emitting light in the holding frame, thereby reducing the display flickering.

In some embodiments, the pixel circuit may further include a bias transistor. The first electrode of the bias transistor may be electrically connected to the bias signal line, and the second electrode of the bias transistor may be electrically connected to the first electrode of the driving transistor and/or the second electrode of the driving transistor. The display panel may further include fourth shift register units, and one fourth shift register unit may be used to provide a fourth control signal to the gate of one corresponding bias transistor.

The start time of the fourth conduction period of the bias transistor may be after the cut-off time of the first conduction period.

Figure 13:
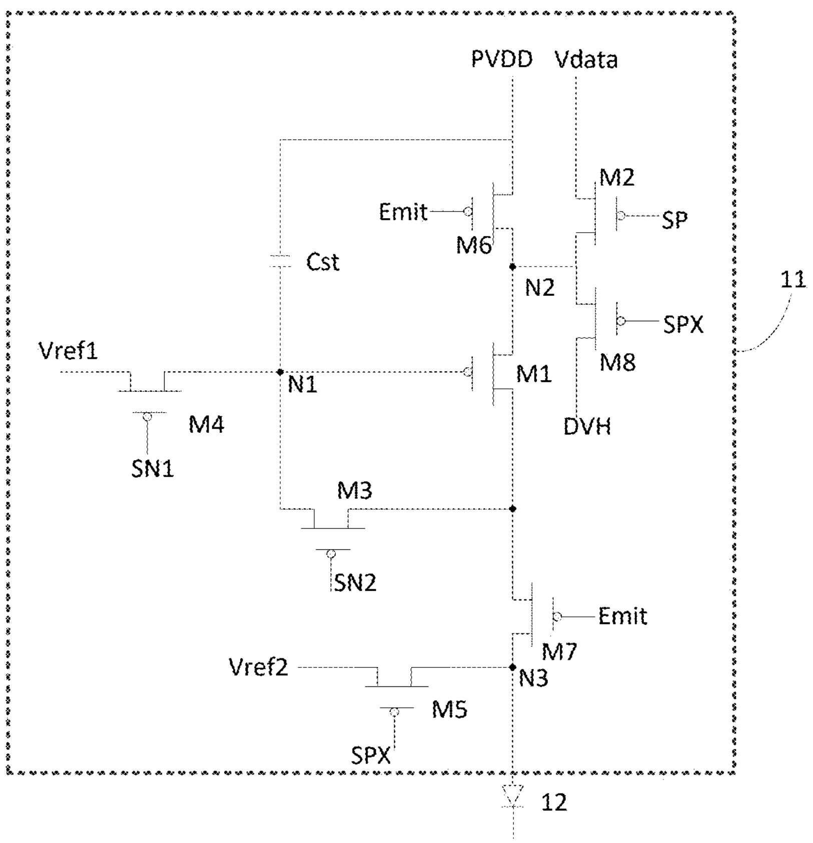
FIG. 13 illustrates another exemplary pixel circuit consistent with various disclosed embodiments in the present disclosure.
Figure 14:
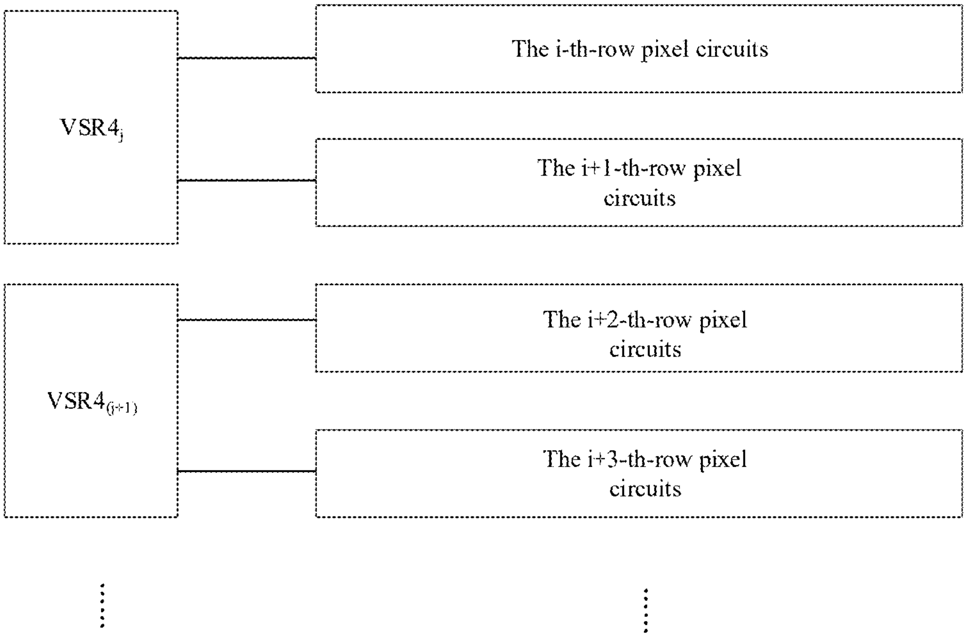
FIG. 14 illustrates another schematic connection of a shift register unit consistent with various disclosed embodiments in the present disclosure.

In one embodiment, as shown in FIG. 13 which is a structural schematic diagram of another pixel circuit provided by the present disclosure, the pixel circuit may further include a bias transistor M8. The first electrode of the bias transistor M8 may be electrically connected to the bias signal line DVH. The embodiment shown in FIG. 13 where the second electrode of the bias transistor M8 is electrically connected to the first electrode of the driving transistor M1 is used as an example to illustrate the present disclosure. The display panel may further include fourth shift register units, and the fourth shift register units may be used to provide a fourth control signal SPX to the gates of the bias transistors M8. As shown in FIG. 14 which is a connection diagram of shift register units, one fourth shift register unit may be exemplarily set to be electrically connected to the gates of the bias transistors in the pixel circuits of the i-th row and the gates of the bias transistors in the pixel circuit of the (i+1)-th row. One fourth shift register unit may be used to provide a fourth control signal for the two adjacent rows of pixel circuits. FIG. 14 exemplarily shows two cascaded shift register units VSR4*j* and VSR4(*j*+1).

Figure 15:
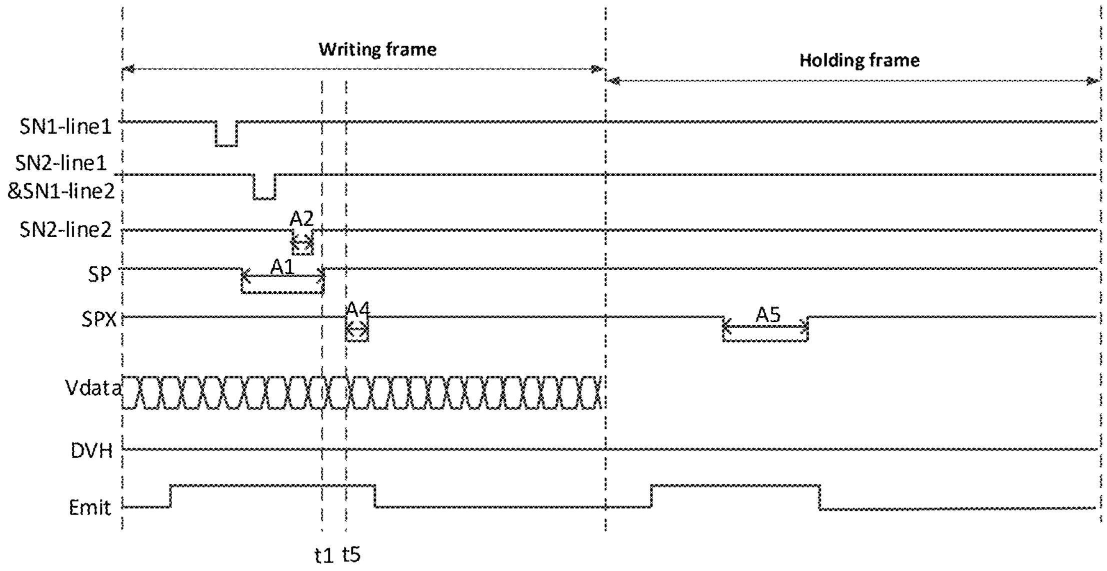
FIG. 15 illustrates another driving timing diagram of an exemplary display panel consistent with various disclosed embodiments in the present disclosure.

As shown in FIG. 15 which is a driving timing diagram, in one embodiment, a bias transistor M8 may be added into the pixel circuit, and the start time t5 of the fourth conduction period A4 of the bias transistor M8 may be set to be located after the cut-off time t1 of the first conduction period A1. That is, after data is written, the bias transistor M8 may be controlled to be turned on by the fourth control signal SPX provided by the fourth shift register unit, such that the bias signal DVH on the bias signal line DVH (in the present disclosure, the signal line and the signal transmitted by the signal line may be represented by the same symbol for convenience of description) may be written to the N2 node to reset the N2 node. By adjusting the potential applied to the N2 node, the bias state of the driving transistor M1 may be adjusted, thereby improving the offset or hysteresis phenomenon of the characteristics of the driving transistor M1 after long-term operation.

In some embodiments, when the display panel supports the low-frequency mode, as shown in FIG. 15, the first conduction period A1, the second conduction period A2, and the fourth conduction period A4 may be set to be in the writing frame. The fourth shift register unit may be also used to provide the effective level of the fourth control signal SPX to the bias transistor M8 in the fifth conduction period A5 of the holding frame (the effective level of the fourth control signal SPX may be exemplarily set to be a low level in FIG. 15), and control the bias transistor M8 to be turned on.

When the display panel performs display in the low-frequency mode, since the writing frame has a data writing process and a reset process of the gate of the driving transistor, there may be no such process in the holding frame. For example, in the writing frame, after resetting the gate of the driving transistor, the gate potential of the driving transistor may be the first initialization signal provided by the first initialization signal line. At this time, the N1 node in FIG. 13 may be Vref1, and Vref1 may be generally a negative potential, such as −3V. The potential of the N2 node may be still the PVDD when the previous frame illuminated, such that the voltage difference between the N1 node and the N2 node (the gate-source voltage difference of the driving transistor) may be relatively large in the writing frame. In the holding frame, the gate of the driving transistor may be no longer reset or initialized, and the holding frame N1 node may be Vdata+Vth, where Vth may be the threshold voltage of the driving transistor. Therefore, the voltage difference between N1 node and the N2 node in the holding frame may be much smaller than that between the N1 node and the N2 node in the writing frame, which may cause flickering problems during low-frequency display. Based on the above-mentioned problems, the present disclosure may also include a process in the holding frame similar to the large voltage difference between N1 node and the N2 node in the writing frame. That is, in the fifth conduction period A5 of the holding frame, the effective level of the fourth control signal SPX may be provided to the bias transistor M8, and the bias transistor M8 may be controlled to be turned on, such that the states of the driving transistors of the holding frame and the writing frame may be closer, thereby avoiding the flickering problem of low-frequency display.

In some embodiments, the duration of the fifth conduction period may be greater than or equal to the duration of the fourth conduction period.

As shown in FIG. 15, the duration of the fifth conduction period A5 may be greater than or equal to the duration of the fourth conduction period A4, that is, the duration of the OBS bias in the holding frame may be greater than the duration of the OBS bias in the writing frame.

In the writing frame, after the N1 node is reset, the voltage difference between the N1 node potential and the N2 node potential may be large. For example, the N1 node potential Vref may be −3V, the N2 node may be PVDD or Vdata, and the voltage difference between the N1 node potential and the N2 node potential may be 3V. In the holding frame, the N1 node potential may be Vdata+Vth, for example, 2V, and the bias caused by the voltage difference between the N1 node potential and the N2 node potential similar as the writing frame may be constructed by providing the bias signal line DVH potential to the N2 node. However, to avoid the high power consumption caused by the excessively high DVH, in one embodiment, the duration of the fifth conduction period A5 may be set to be greater than or equal to the duration of the fourth conduction period A4, and the OBS duration of the holding frame (the duration when the fourth control signal SPX may be at the effective level) may be increased, to achieve similar bias strengths for the holding frame and the writing frame.

In some embodiments, one fourth shift register unit may be electrically connected to the gates of the bias transistors corresponding to the pixel circuits of the i-th row and the gates of the bias transistors corresponding to the pixel circuits of the (i+1)-th row.

In the embodiments of the present disclosure, one fourth shift register unit may be electrically connected to the gates of the bias transistors corresponding to the pixel circuits of two adjacent rows. Compared with existing technologies where pixel circuits of each row are electrically connected to one shift register unit, the fourth control signal may be provided to pixel circuits of two rows through one shift register unit, thereby reducing the number of shift register units, saving the number of shift register units set in the frame area of the display panel, and reducing the width of the frame area.

In some embodiments, the data writing transistor may be multiplexed as the bias transistor and the data writing transistor may be used to bias the drive transistor during the bias period.

The bias period may be between the end time of the second conduction period of a row of pixel circuits and the end time of the first conduction period of the row of pixel circuits.

Figure 16:
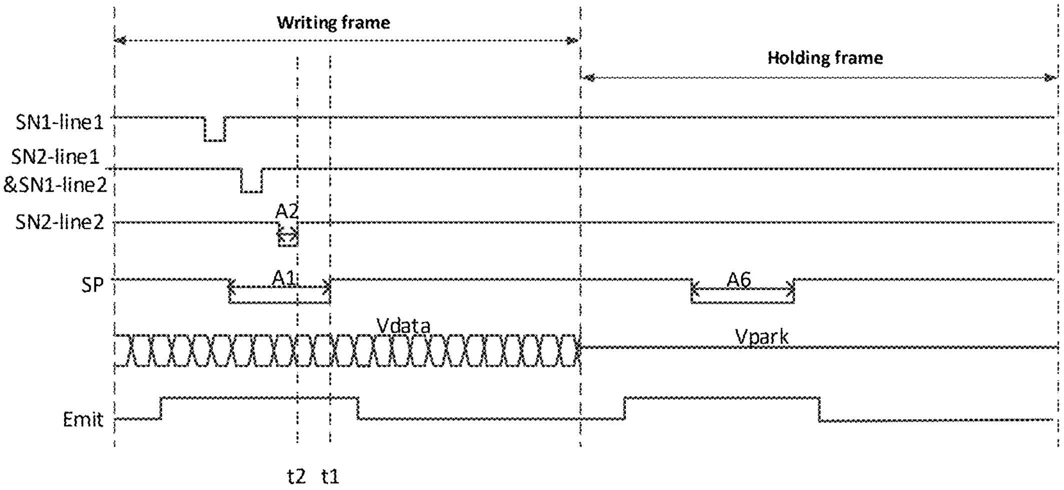
FIG. 16 illustrates another driving timing diagram of an exemplary display panel consistent with various disclosed embodiments in the present disclosure.

As shown in FIG. 16 which is another driving timing diagram, in one embodiment, still taking the pixel circuit shown in FIG. 2 as an example, the data writing transistor M2 may be multiplexed as the biasing transistor. Taking the pixel circuits of the second row as an example, when SN2-line2 and SP are both low level, the data writing transistors and the threshold compensation transistors of the second row of pixel circuits may be turned on, such that the data signal may be written into the N1 node of the gates pf the driving transistors M1 of the second row of pixel circuits. The moment when SN2-line2 jumps to a high level may be the end time t2 of the second conduction period of the second row of pixel circuits. After SN2-line2 jumps to a high level, the threshold compensation transistors of the second row of pixel units may be turned off, and SP may be still at an effective level (FIG. 16 takes the effective level of SP as a low level as an example). From the cut-off time t2 of the second conduction period of the second row pixel circuits to the cut-off time t1 of the first conduction period of the second row of pixel circuits, SP may be at an effective level, such that the data writing transistors of the second-row pixel circuits may bias the driving transistors during the period (bias period) from the cut-off time t2 of the second conduction period to the cut-off time t1 of the first conduction period.

In some embodiments, the first conduction period and the second conduction period may be located in the writing frame; and the first shift register units may be also used to provide a fifth control signal to the data writing transistors in the sixth conduction period of the holding frame to control the conduction of the data writing transistors.

When the display panel displays in the low-frequency mode, the writing frame may include a data writing process and a reset process of the gates of the driving transistors, but the holding frame may not have the above processes. The above difference may cause the brightness difference between the writing frame and the holding frame, causing low-frequency flicker. Therefore, in the present disclosure, the effective level of the fifth control signal Vpark may be provided to the data writing transistor M2 in the sixth conduction period A6 of the holding frame, to control the data writing transistor M2 to turn on and make the states of the driving transistor closer in the holding frame and the writing frame, thereby avoiding the flickering problem of low-frequency display.

In some implementations, the duration of the sixth conduction period may be set equal to the duration of the first conduction period.

In the embodiments of the present disclosure, the data writing transistor may be multiplexed as the bias transistor to perform OBS bias, and the OBS bias may be performed in the low-level signal stage of the SP of the writing frame and the holding frame. In this embodiment, the duration of the sixth conduction period (the low-level signal stage of the SP of the holding frame in FIG. 16) may be set to be equal to the duration of the first conduction period (the low-level signal stage of the SP of the writing frame in FIG. 16), such that the drive timing of the SP may be simpler.

In some embodiments, the duration of the sixth conduction period A6 may be set to be less than the duration of the first conduction period A1.

In the writing frame, taking the second row of pixel circuits as an example, SP may first jump to the effective level, and then SN1-line2 and SN2-line2 may jump to the effective level in sequence. Therefore, the effective level period of the writing frame SP (the first conduction period A1 of the data writing transistor) may be relatively long.

In the scheme of multiplexing the data writing transistor as the bias transistor in FIG. 2, the time for biasing in the writing frame may be between t2 and t1 in FIG. 16. Therefore, in the first conduction period A1, the data signal may be mainly written. In the holding frame, it may be necessary to provide a fifth control signal to the N2 node of the drive transistor through the data writing transistor in the sixth conduction period A6 for OBS bias. To make the OBS bias of the holding frame and the writing frame as consistent as possible, in one embodiment of the present disclosure, the duration of the sixth conduction period A6 may be set to be shorter than the duration of the first conduction period A1.

For example, the time interval between the cut-off moment of the second conduction period and the cut-off moment of the first conduction period (the time from t2 to t1 in FIG. 16) may be set to be the same as the duration of the sixth conduction period.

In some embodiments, the time interval between the cut-off moment of the second conduction period and the cut-off moment of the first conduction period may be less than 100 microseconds.

For example, as shown in FIG. 8, FIG. 9, FIG. 12, FIG. 15, and FIG. 16, the rising edge of the first control signal SP of each row of pixel circuits may lag behind the rising edge of the second control signal SN2 of the row, that is, the cut-off time of the second conduction period may precede the cut-off time of the first conduction period, to avoid the problem that the level jump of the first control signal SP affects the data signal voltage stored in the pixel circuit. The period between the cut-off time of the second conduction period and the cut-off time of the first conduction period may also achieve the effect of OBS biasing the driving transistor in the writing frame. Based on the effect of OBS bias and the consideration of the overall luminous time, the embodiments of the present disclosure may, for example, set the time interval between the cut-off time of the second conduction period and the cut-off time of the first conduction period to be less than 100 microseconds.

In some embodiments, the start time of the first conduction period of the data writing transistor connected to one first shift register unit may precede the start time of the second conduction period of the threshold compensation transistor connected to one corresponding second shift register unit.

The corresponding second shift register unit may be one second shift register unit corresponding to the pixel circuits electrically connected to the first shift register unit.

One first shift register unit may be electrically connected to the data writing transistors of multiple rows of pixel circuits. Taking the driving timing shown in FIG. 9 as an example, one first shift register unit may be connected to the data writing transistors of the first row of pixel circuits line 1 and the data writing transistors of the second row of pixel circuits line 2. The second control signal provided by the second shift register unit corresponding to the threshold compensation transistor of the first row of pixel circuits may be SN2-line1, and the second control signal provided by the second shift register unit corresponding to the threshold compensation transistor of the second row of pixel circuits may be SN2-line2.

In one embodiment, the start time of the first conduction period of the data writing transistor connected to the first shift register unit may be set to be earlier than the start time of the second conduction period of the threshold compensation transistor connected to the corresponding second shift register unit. The corresponding second shift register unit may be the second shift register unit corresponding to the pixel circuits electrically connected to the first shift register unit. As shown in FIG. 9, the start time t6 of the first conduction period A1 of the data writing transistor connected to the first shift register unit may be earlier than the start time t31 of the second conduction period A2 of the threshold compensation transistor connected to the first row of pixel circuits connected to the first shift register unit, and may be earlier than the start time t32 of the second conduction period A2 of the threshold compensation transistors connected to the second row of pixel circuits connected to the first shift register unit.

The overlap time of the first conduction period of the data writing transistor and the second conduction period of the threshold compensation transistor of the same pixel circuit may be the charging time of the pixel circuit. Therefore, the start time t6 of the first control signal SP may need to be earlier than the control signal SN2-line1 of the gate of the threshold compensation transistor of the first row of pixel circuits, to ensure that the charging time of the two rows of pixel circuits may be consistent and avoid display differences.

Figure 17:
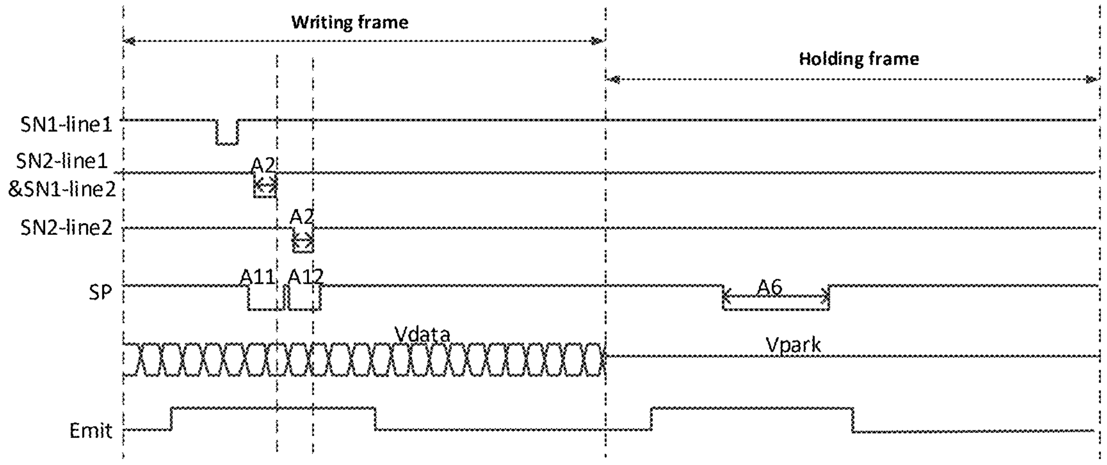
FIG. 17 illustrates another driving timing diagram of an exemplary display panel consistent with various disclosed embodiments in the present disclosure.

In some embodiments, the first conduction period may include multiple sub-periods. Each sub-period may correspond to the second conduction period of the threshold compensation transistor of each row of pixel circuits connected to the same second shift register unit, and at least partially overlap. In the one-to-one corresponding sub-periods and the second conduction periods, the cut-off time of the second conduction period may precede the cut-off time of the sub-periods. For example, as shown in FIG. 17, the first conduction period may include two sub-periods A11 and A12. The sub-period A11 may correspond to the second conduction period A2 of the threshold compensation transistors of the first row of pixel circuits connected to the second shift register unit, and at least partially overlap, such that the data signal may be written to the gate of the driving transistors of the first row of pixel circuits in the overlapping period. The sub-period A12 may correspond to the second conduction period A2 of the threshold compensation transistors of the second row of pixel circuits connected to the second shift register unit, and at least partially overlap, such that the data signal may be written to the gate of the driving transistors of the second row of pixel circuits in the overlapping period. The cut-off time of the second conduction period A2 of the threshold compensation transistors of the first row of pixel circuits may precede the cut-off time of the sub-period A11. The cut-off time of the second conduction period A2 of the threshold compensation transistors of the second row of pixel circuits may be earlier than the cut-off time of the sub-period A121, such that the threshold compensation transistors of each row of pixel circuits may be turned off first, and then the data writing transistor may be turned off. After the threshold compensation transistors are turned off, the data writing process may stop randomly, and the jump of the first control signal SP may no longer affect the data signal voltage stored in the pixel circuit.

In some embodiments, the data writing transistor may be multiplexed as the biasing transistor, and the data writing transistor may be used to write a data signal to the driving transistor for biasing in the seventh conduction period. The start time of the seventh conduction period may be after the end time of the first conduction period.

Figure 18:
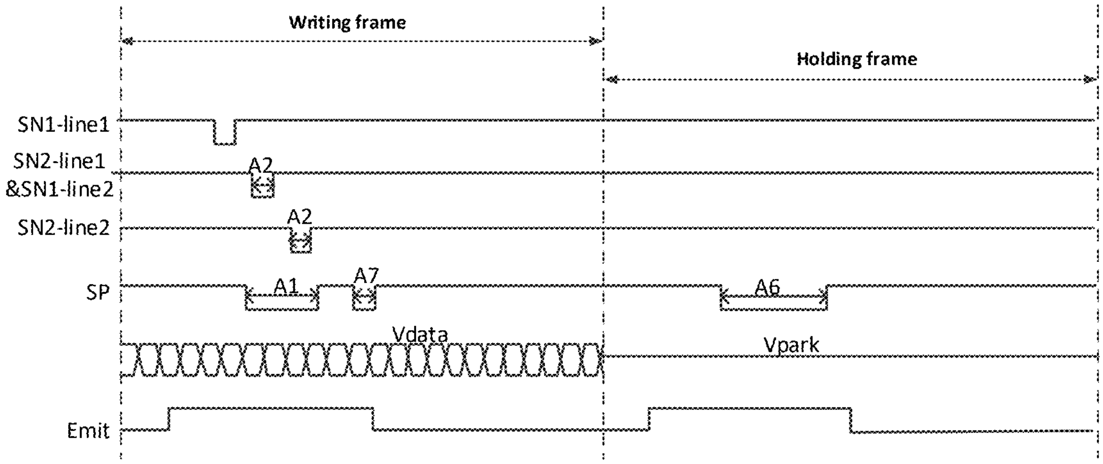
FIG. 18 illustrates another driving timing diagram of an exemplary display panel consistent with various disclosed embodiments in the present disclosure.

As shown in FIG. 18 which is another driving timing diagram, the start time of the seventh conduction period A7 may be after the end time of the first conduction period A1. The first conduction period A1 may be used for data writing. After the first conduction period A1 ends, in the seventh conduction period A7, the data writing transistor of the pixel circuit may be multiplexed as the biasing transistor. For example, the data writing transistor may write a data signal to the source of the driving transistor in the seventh conduction period A7 for biasing, thereby improving the offset or hysteresis of the characteristics of the driving transistor after long-term operation.

It should be noted that the driving timing shown in FIG. 15 to FIG. 18 is exemplarily described by taking each second shift register unit connected to two adjacent rows of pixel circuits as an example, for example, the connection architecture of the shift register unit shown in FIG. 10 may be adopted. For example, one second shift register unit may be connected to the gates of the threshold compensation transistors of the first row of pixel units and the gates of the first initialization transistors of the second row of pixel units.

It should be noted that, in the driving timing diagram of the embodiments of the present disclosure, the signal received by the gate of each transistor in the pixel circuit may be a valid signal when it is a low level, and the transistor may be turned on; when it is high level, the transistor may be turned off. Therefore, the transistor may be a P-type transistor. In other embodiments, according to the design requirements of the display panel, it may be set that each transistor in the pixel circuit may be an N-type transistor, and the signal received by the gate of the transistor may be a valid signal when it may be high level, and the transistor may be turned on; when it may be low level, the transistor may be turned off. It may also be set according to the design requirements that the pixel circuit includes N-type transistors and P-type transistors, and the corresponding driving timing may be selected according to the type of transistor (the effective level of the control signal corresponding to the N-type transistor may be a high level, and the effective level of the control signal corresponding to the P-type transistor may be a low level).

Figure 19:
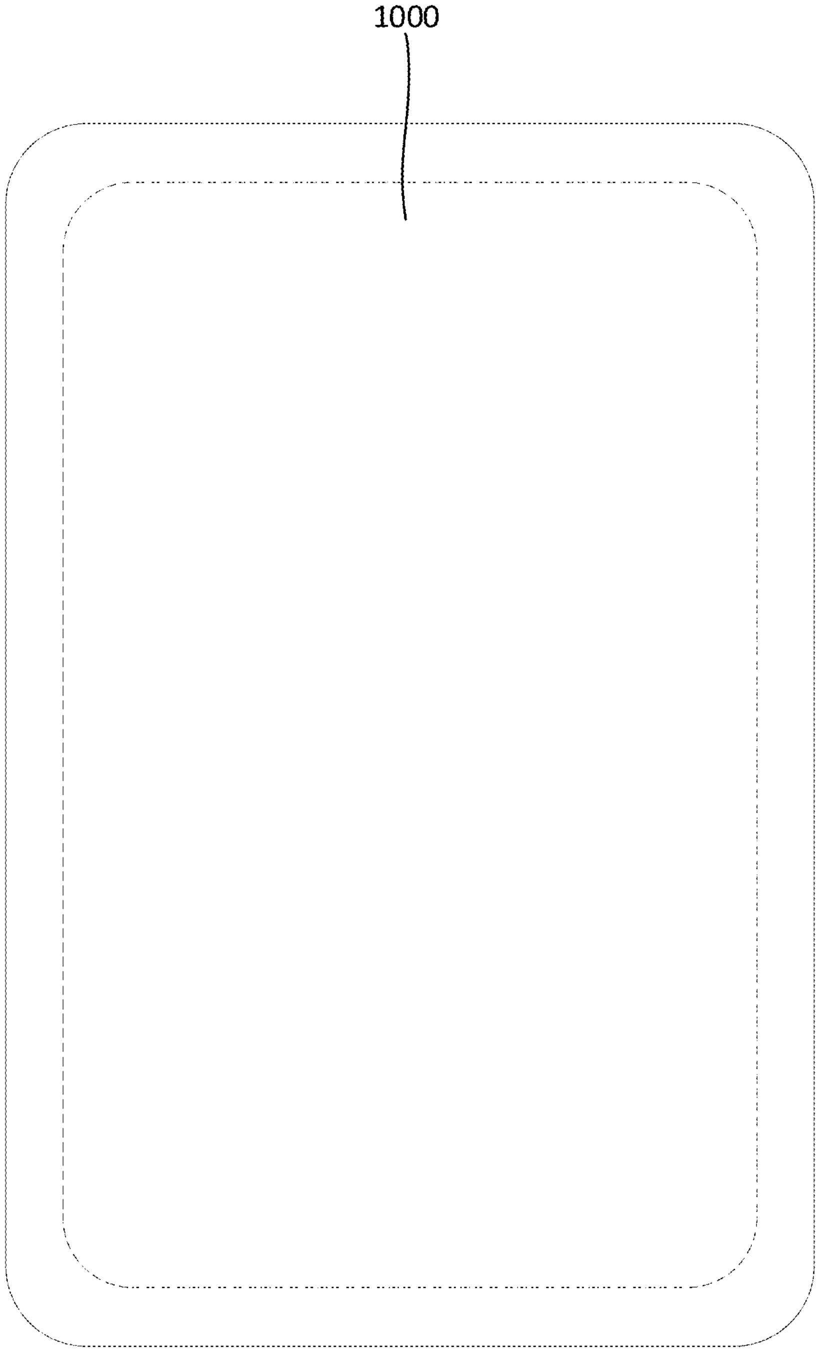
FIG. 19 illustrates an exemplary display device consistent with various disclosed embodiments in the present disclosure.

The present disclosure also provides a display device. As shown in FIG. 19 which is a structural schematic diagram of a display device, the display device may include a display panel provided by any one of the above-mentioned display panel embodiments.

As shown in FIG. 19, the display device 1000 provided in the embodiments of the present disclosure may include the display panel in the above embodiments, and thus may also achieve the same or at least similar technical effects as the above display panel embodiments, which will not be described in detail here.

In the present disclosure, relational terms such as "first" and "second" are only used to distinguish one entity or operation from another entity or operation, and do not necessarily require or imply that there is a relationship between these entities or operations. There is no such actual relationship or sequence. Furthermore, the terms "comprises", "include", or any other variations thereof are intended to cover a non-exclusive inclusion such that a process, method, article, or apparatus that includes a list of elements includes not only those elements, but also those not expressly listed, or elements inherent to the process, method, article or equipment. Without further limitation, an element defined by the statement "comprises a . . . " does not exclude the presence of additional identical elements in a process, method, article, or apparatus that includes the stated element.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A display panel, comprising:

a plurality of light-emitting pixels arranged in an array, wherein: a light-emitting pixel includes a pixel circuit and a light-emitting element; the pixel circuit includes a driving transistor, a data writing transistor, and a threshold compensation transistor; the driving transistor is used to provide a driving current for the light-emitting element; a first electrode of the data writing transistor is electrically connected to a data signal line, and a second electrode of the data writing transistor is electrically connected to a first electrode of the driving transistor; a first electrode of the threshold compensation transistor is electrically connected to a second electrode of the driving transistor, and a second electrode of the threshold compensation transistor is electrically connected to a gate of the driving transistor;

first shift register units, wherein one first shift register unit is at least used to provide a first control signal to a gate of one data writing transistor; and second shift register units, wherein one second shift register unit is at least used to provide a second control signal to one threshold compensation transistor, wherein:

a first conduction period of the data writing transistor at least partially overlaps with a second conduction period of the threshold compensation transistor, and a cut-off time of the second conduction period precedes a cut-off time of the first conduction period; and a start time of the first conduction period of the data writing transistor connected to one first shift register unit is earlier than a start time of the second conduction period of the threshold compensation transistor connected to one corresponding second shift register unit, wherein the corresponding second shift register unit is one second shift register unit connected to pixel circuits electrically connected to the first shift register unit.

2. The display panel according to claim 1, wherein:

a number of rows of pixel circuits electrically connected to one first shift register unit is the same as a number of rows of pixel circuits electrically connected to one second shift register unit.

3. The display panel according to claim 2, wherein:

the first conduction period includes a plurality of sub-periods;

each of the plurality of sub-periods corresponds, in a one-to-one manner to, and at least partially overlaps, the second conduction period of the threshold compensation transistors of each row of pixel circuits connected to the same second shift register unit; and in the one-to-one corresponding sub-period and the second conduction period, an end time of the second conduction period is prior to an end time of the sub-period.

4. The display panel according to claim 1, wherein:

the pixel circuit further includes a first initialization transistor connected between the gate of the driving transistor and a first initialization signal line; and in one same pixel circuit, a cut-off time of a third conduction period of the first initialization transistor is earlier than the start time of the second conduction period.

5. The display panel according to claim 4, wherein:

one second shift register unit is electrically connected to gates of threshold compensation transistors corresponding to pixel circuits of an i-th row and gates of first initialization transistors corresponding to pixel circuits of an (i+x)-th row, wherein i and x are both positive integers larger than or equal to 1.

6. The display panel according to claim 5, wherein:

one second shift register unit is electrically connected to the gates of the threshold compensation transistors corresponding to the pixel circuits of the i-th row and gates of first initialization transistors corresponding to pixel circuits of an (i+2)-th row.

7. The display panel according to claim 5, wherein:

one second shift register unit is electrically connected to the gates of the threshold compensation transistors corresponding to the pixel circuits of the i-th row and gates of first initialization transistors corresponding to pixel circuits of an (i+1)-th row.

8. The display panel according to claim 4, wherein: the pixel circuit further includes a second initialization transistor connected between an anode of the light emitting element and a second initialization signal line, wherein a gate of the second initialization transistor is electrically connected to a gate of the first initialization transistor.

9. The display panel according to claim 1, wherein: one first shift register unit is electrically connected to gates of data writing transistors corresponding to pixel circuits of an i-th row and gates of data writing transistors corresponding to pixel circuits of an (i+1)-th row.

10. The display panel according to claim 1, wherein: the pixel circuit further includes a light-emitting control transistor connected in series with the driving transistor and used to selectively allow the light-emitting element to enter a light-emitting stage; and the display panel further includes third shift register units, wherein: one third shift register unit is electrically connected to the gate of the light-emitting control transistor in one corresponding pixel circuit, and is used to provide a third control signal for the pixel circuit such that the light-emitting control transistor is turned on in response to the third control signal.

11. The display panel according to claim 10, wherein: one third shift register unit is electrically connected to gates of light emitting control transistors in pixel circuits of an i-th row and gates of light emitting control transistors in pixel circuits of an (i+1)-th row, and is used to provide the third control signal for pixel circuits of two adjacent rows.

12. The display panel according to claim 1, wherein: the data writing transistor and the threshold compensation transistor are both P-type transistors.

13. The display panel according to claim 1, wherein: the data writing transistor is a P-type transistor and the threshold compensation transistor is an N-type transistor.

14. The display panel according to claim 1, wherein: the pixel circuit further includes a second initialization transistor connected between an anode of the light emitting element and a second initialization signal line, wherein a gate of the second initialization transistor is electrically connected to a gate of the data writing transistor.

15. The display panel according to claim 14, wherein: a frequency of the first control signal is larger than a frequency of the second control signal.

16. The display panel according to claim 1, wherein: the pixel circuit further includes a bias transistor, wherein a first electrode of the bias transistor is electrically connected to a bias signal line, and a second electrode of the bias transistor is electrically connected to the first electrode of the driving transistor and/or the second electrode of the driving transistor; and the display panel further includes fourth shift register units, wherein one fourth shift register unit is used to provide a fourth control signal to a gate of a corresponding bias transistor, and a start time of a fourth conduction period of the bias transistor is located after the cut-off time of the first conduction period.

17. The display panel according to claim 16, wherein: the first conduction period, the second conduction period, and the fourth conduction period are located in a writing frame; and the fourth shift register unit is further used to provide an effective level of the fourth control signal to the bias transistor in a fifth conduction period of a holding frame to control the bias transistor to turn on.

18. A display panel, comprising: a plurality of light-emitting pixels arranged in an array, wherein: a light-emitting pixel includes a pixel circuit and a light-emitting element; the pixel circuit includes a driving transistor, a data writing transistor, and a threshold compensation transistor; the driving transistor is used to provide a driving current for the light-emitting element; a first electrode of the data writing transistor is electrically connected to a data signal line, and a second electrode of the data writing transistor is electrically connected to a first electrode of the driving transistor; a first electrode of the threshold compensation transistor is electrically connected to a second electrode of the driving transistor, and a second electrode of the threshold compensation transistor is electrically connected to a gate of the driving transistor; first shift register units, wherein one first shift register unit is at least used to provide a first control signal to a gate of one data writing transistor; and second shift register units, wherein one second shift register unit is at least used to provide a second control signal to one threshold compensation transistor, wherein: a first conduction period of the data writing transistor at least partially overlaps with a second conduction period of the threshold compensation transistor, and a cut-off time of the second conduction period precedes a cut-off time of the first conduction period; and the data writing transistor is multiplexed as a bias transistor, and is used to bias the driving transistor during a bias period, wherein the bias period is between the cut-off time of the second conduction period of a row of pixel circuits and the cut-off time of the first conduction period of the row of pixel circuits.

19. A display device comprising a display panel, wherein: the display panel includes: a plurality of light-emitting pixels arranged in an array, wherein: each light-emitting pixel includes a pixel circuit and a light-emitting element; the pixel circuit includes a driving transistor, a data writing transistor, and a threshold compensation transistor; the driving transistor is used to provide a driving current for the light-emitting element; a first electrode of the data writing transistor is electrically connected to a data signal line, and a second electrode of the data writing transistor is electrically connected to a first electrode of the driving transistor; a first electrode of the threshold compensation transistor is electrically connected to a second electrode of the driving transistor, and a second electrode of the threshold compensation transistor is electrically connected to a gate of the driving transistor; first shift register units, wherein one first shift register unit is at least used to provide a first control signal to a gate of one data writing transistor; and second shift register units, wherein one second shift register unit is at least used to provide a second control signal to one threshold compensation transistor, wherein: a first conduction period of the data writing transistor at least partially overlaps with a second conduction period of the threshold compensation transistor, and a cut-off time of the second conduction period precedes a cut-off time of the first conduction period; and a start time of the first conduction period of the data writing transistor connected to one first shift register unit is earlier than a start time of the second conduction period of the threshold compensation transistor connected to one corresponding second shift register unit, wherein the corresponding second shift register unit is one second shift register unit connected to pixel circuits electrically connected to the first shift register unit.

* * * * *